US012587784B2

(12) United States Patent
Harris et al.

(10) Patent No.: US 12,587,784 B2
(45) Date of Patent: Mar. 24, 2026

(54) ENHANCE VIRTUAL AUDIO CAPTURE IN AUGMENTED REALITY (AR) EXPERIENCE RECORDINGS

(71) Applicant: Snap Inc., Santa Monica, CA (US)

(72) Inventors: Daniel Harris, San Francisco, CA (US); Mykola Marynin, Utrecht (NL)

(73) Assignee: Snap Inc., Santa Monica, CA (US)

( * ) Notice: Subject to any disclaimer, the term of this patent is extended or adjusted under 35 U.S.C. 154(b) by 48 days.

(21) Appl. No.: 18/505,800

(22) Filed: Nov. 9, 2023

(65) Prior Publication Data

US 2024/0357286 A1      Oct. 24, 2024

Related U.S. Application Data

(60) Provisional application No. 63/497,184, filed on Apr. 19, 2023.

(51) Int. Cl.
| | |
|---|---|
| *H04R 3/02* | (2006.01) |
| *G02B 27/01* | (2006.01) |
| *G10L 21/0208* | (2013.01) |

(52) U.S. Cl.
CPC ............. H04R 3/02 (2013.01); G02B 27/017 (2013.01); G10L 21/0208 (2013.01); *G02B 2027/0178* (2013.01); *G10L 2021/02082* (2013.01)

(58) Field of Classification Search
None
See application file for complete search history.

(56) References Cited

U.S. PATENT DOCUMENTS

| | | |
|---|---|---|
| 2016/0329036 A1 | 11/2016 | Uehara |
| 2018/0341455 A1* | 11/2018 | Ivanov .................... G06F 40/58 |
| 2021/0035597 A1 | 2/2021 | Eubank et al. |
| 2022/0021972 A1 | 1/2022 | Brimijoin, II et al. |
| 2022/0057985 A1 | 2/2022 | Huang |

OTHER PUBLICATIONS

"International Application Serial No. PCT/US2024/025219, International Search Report mailed Jul. 4, 2024", 4 pgs.
"International Application Serial No. PCT/US2024/025219, Written Opinion mailed Jul. 4, 2024", 8 pgs.

* cited by examiner

*Primary Examiner* — Paul W Huber
(74) *Attorney, Agent, or Firm* — Schwegman Lundberg & Woessner, P.A.

(57)      ABSTRACT

A method to enhance virtual audio capture in Augmented Reality (AR) experience recordings starts with a processor receiving a video from a camera that includes images of a real-world scene and an AR content item. Processor receives acoustic signals from microphones generate acoustic signals using real-world audio and speaker output that including AR audio of the AR content item. Processor receives an audio file associated with the AR audio of the AR content item and generates an enhanced audio using the acoustic signals and the audio file. Processor generates an enhanced video using the video and the enhanced audio. Other examples are described herein.

20 Claims, 10 Drawing Sheets

400

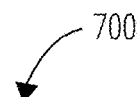

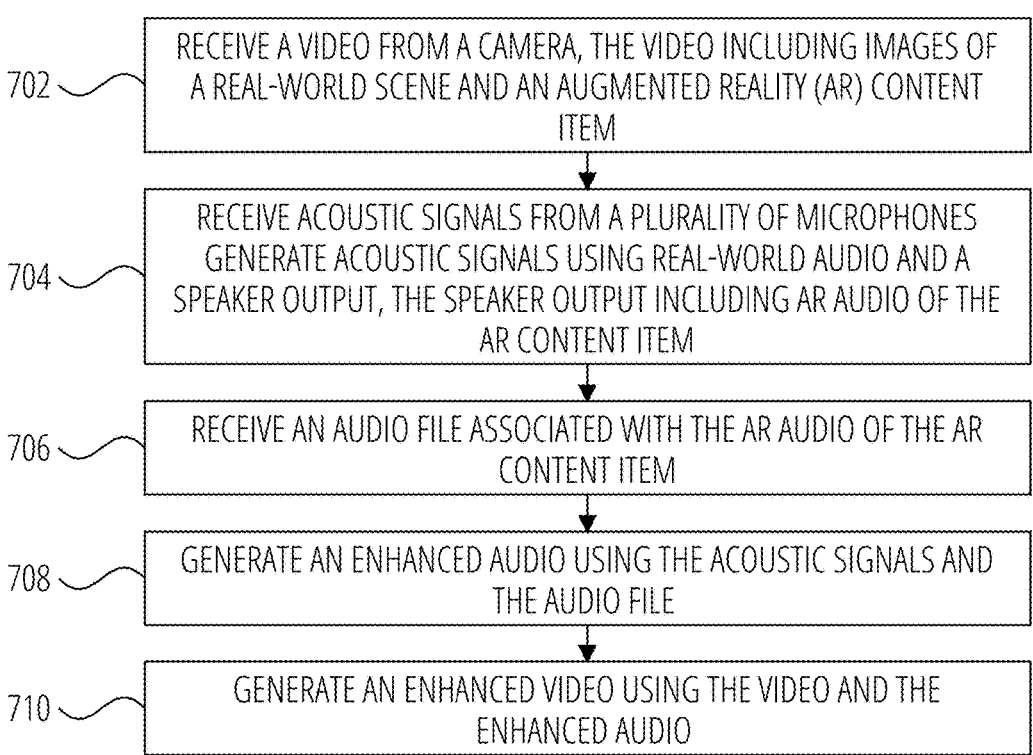

702 — RECEIVE A VIDEO FROM A CAMERA, THE VIDEO INCLUDING IMAGES OF A REAL-WORLD SCENE AND AN AUGMENTED REALITY (AR) CONTENT ITEM

704 — RECEIVE ACOUSTIC SIGNALS FROM A PLURALITY OF MICROPHONES GENERATE ACOUSTIC SIGNALS USING REAL-WORLD AUDIO AND A SPEAKER OUTPUT, THE SPEAKER OUTPUT INCLUDING AR AUDIO OF THE AR CONTENT ITEM

706 — RECEIVE AN AUDIO FILE ASSOCIATED WITH THE AR AUDIO OF THE AR CONTENT ITEM

708 — GENERATE AN ENHANCED AUDIO USING THE ACOUSTIC SIGNALS AND THE AUDIO FILE

710 — GENERATE AN ENHANCED VIDEO USING THE VIDEO AND THE ENHANCED AUDIO

FIG. 7

ENHANCE VIRTUAL AUDIO CAPTURE IN AUGMENTED REALITY (AR) EXPERIENCE RECORDINGS

CROSS-REFERENCE TO RELATED APPLICATION

This patent application claims the benefit of U.S. Provisional Patent Application No. 63/497,184, filed Apr. 19, 2023, entitled "ENHANCE VIRTUAL AUDIO CAPTURE IN AUGMENTED REALITY (AR) EXPERIENCE RECORDINGS", which is incorporated by reference herein in its entirety.

BACKGROUND

Currently, a number of consumer electronic devices are adapted to capture audio and/or visual content. For example, a user can use the built-in cameras on a mobile device to quickly capture an event or moment occurring in the user's life.

To quickly capture some events or moments that are fleeting, users can also use wearable devices such as augmented reality (AR) glasses that are equipped with built-in cameras. However, when played back, the audio portion of the content that was recorded using the mobile device may not adequately recreate the sound as perceived by the user.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 7 illustrates a process 700 to enhance virtual audio capture in AR experience recordings in accordance with one example.

DETAILED DESCRIPTION

Figure 1:
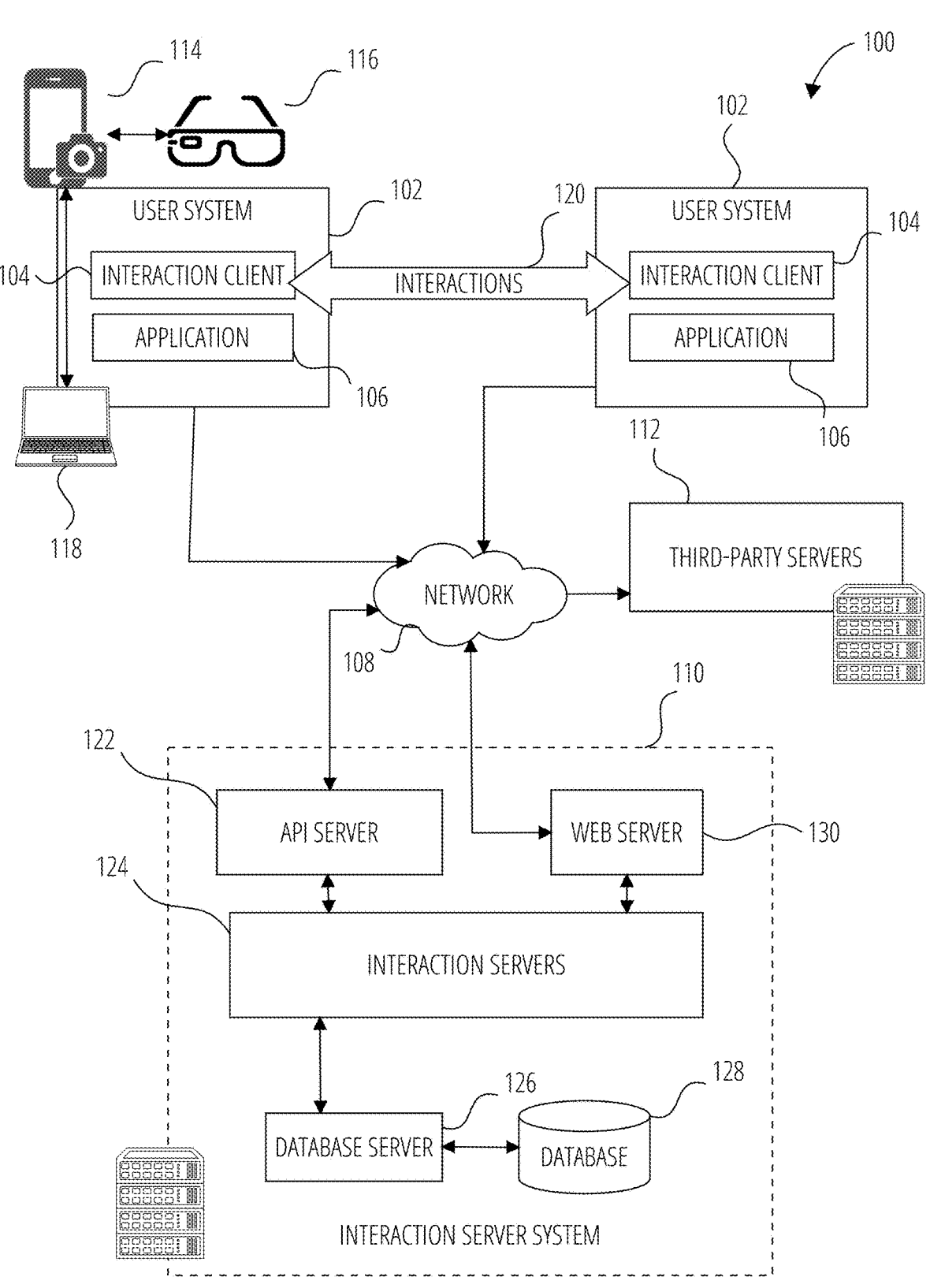
FIG. 1 is a diagrammatic representation of a networked environment in which the present disclosure may be deployed, according to some examples.

User systems that include mobile devices or head-wearable apparatuses (e.g., Augmented Reality (AR) glasses) can be used to capture Augmented Reality (AR) experiences in a video or audio recording. In one example, the AR experiences can include images of a real-world scene as captured by the camera of the user system, and an augmented reality (AR) content item that is a real-time special effect (e.g., a lens) that includes an AR (virtual) object being overlaid on the images of the real-world scene. When capturing the AR experiences in a video or audio recording, the audio recording needs to capture both the virtual sound objects of the AR content item and sounds of the real world.

When using the microphones of the user system to capture the virtual sound objects of the AR content item (e.g., sounds of the singing animated avocado that is overlaid on the real world video image that are output by the user system's speaker) and the sounds of the real world (e.g., the user's voice or birds chirping in the real-world images in the camera frame) results in low quality audio when played back. In other words, the AR audio that generated by and played back by the user system (e.g., the AR glasses) is only captured via the speaker to microphone path, and thus, the resulting audio captured is of low quality. For instance, when playing back the captured audio, the sound of the user's voice may be much louder than the sounds of the singing animated avocado (e.g., AR audio) generated by the speaker.

Mixing the AR audio generated by the speaker to the acoustic signals that are recorded to an audio file presents technical challenges because all the audio processing (e.g., microphone recording, voice changing that may be implemented in association with the AR content item) are running in real-time such that there is no access to the recorded audio file that is being recorded in real-time. Further, synchronizing the audio speaker playback and the microphones recording audio stream is also another technical challenge.

As a solution to these technical challenges and to improve on audio recording that is captured by user systems, some examples of the disclosure are directed to a system and method of enhancing the capture of virtual audio in Augmented Reality (AR) experiences recordings. To cleanly capture the AR audio, in one example, a processor can generate an enhanced audio by capturing AR audio digitally prior to the AR audio being output by the speaker. The speaker-to-microphone path audio can be removed from the acoustic signals captured by the microphones in real-time by using echo cancelling, volume ducking, or other technique.

In another example, the processor can separately store the acoustic signals from the microphones in a storage and the AR audio from the audio file or from the speaker output in the storage. In this example, rather than mixing in real-time, the processor can perform mixing at a later time of the acoustic signals and the AR audio to generate the enhanced audio.

In yet another example, the processor can receive metadata associated with the AR content item and the acoustic signals including raw audio assets. In this example, rather than mixing in real-time, the processor can perform mixing at a later time of the acoustic signals and the AR audio from the audio file using the metadata associated with the AR content item to generate the enhanced audio.

In one example, the user system can be a head-wearable apparatus that captures audio content, which when played back, is an imitation of the sound as perceived by the user of the head-wearable apparatus. Specifically, the head-wearable apparatus can record audio using microphones that are arranged to create 3-dimensional (3D) sound sensation for the listener as if present when the audio was recorded. This is called binaural audio. The playback of the captured audio content will have the effect of binaural audio that has the stereo separation and the spectral content that would mimic a human ear and head response. In this example, when the captured audio content that has the effect of the binaural audio further includes a captured AR audio, the processor can further process the captured audio generate the enhanced audio using these example methods.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

System Architecture

Figure 2:
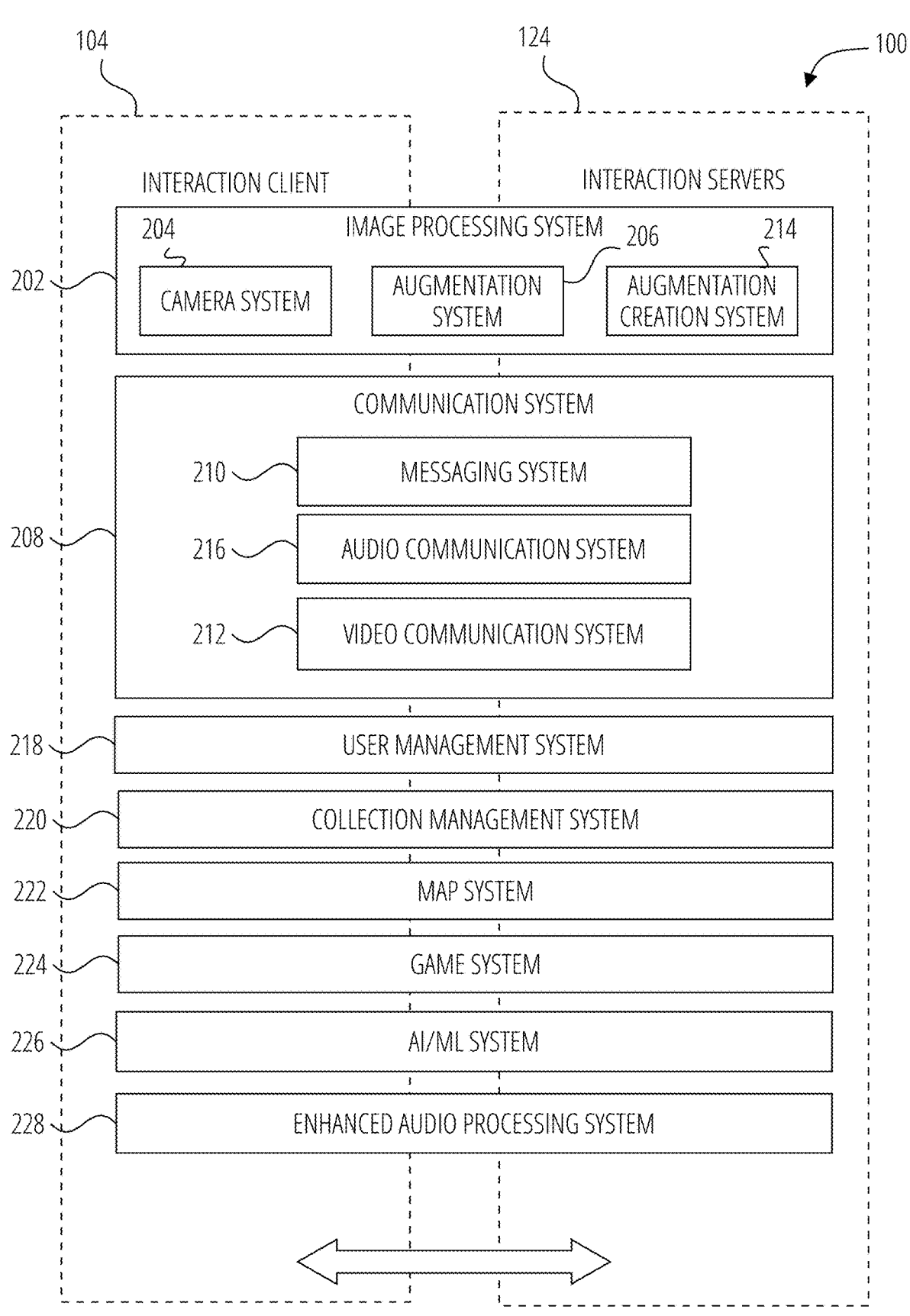
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 802 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An artificial intelligence and machine learning system 226 provides a variety of services to different subsystems within the interaction system 100. For example, the artificial intelligence and machine learning system 226 operates with the image processing system 202 and the camera system 204 to analyze images and extract information such as objects, text, or faces. This information can then be used by the image processing system 202 to enhance, filter, or manipulate images. The artificial intelligence and machine learning system 226 may be used by the augmentation system 206 to generate augmented content and augmented reality experiences, such as adding virtual objects or animations to real-world images. The communication system 208 and messaging system 210 may use the artificial intelligence and machine learning system 226 to analyze communication patterns and provide insights into how users interact with each other and provide intelligent message classification and tagging, such as categorizing messages based on sentiment or topic. The artificial intelligence and machine learning system 226 may also provide chatbot functionality to message interactions 120 between user systems 102 and between a user system 102 and the interaction server system 110. The artificial intelligence and machine learning system 226 may also work with the audio communication system 216 to provide speech recognition and natural language processing capabilities, allowing users to interact with the interaction system 100 using voice commands.

An enhanced audio processing system 228 provides for enhancing the capture of virtual audio in Augmented Reality (AR) experiences recordings. When a user system 102 is used to capture Augmented Reality (AR) experiences in a video or audio recording, the AR experiences can include images of a real-world scene as captured by the camera of the user system 102, and an augmented reality (AR) content item that is a real-time special effect (e.g., a lens) that includes an AR (virtual) object being overlaid on the images of the real-world scene. When capturing the AR experiences in a video or audio recording, the audio recording needs to capture both the virtual sound objects of the AR content item and sounds of the real world.

The enhanced audio processing system 228 can receive a video from a camera that includes images of a real-world scene and the augmented reality (AR) content item. The enhanced audio processing system 228 can also receive acoustic signals from microphones that capture acoustic signals including real-world audio and a speaker output that includes AR audio of the AR content item. The enhanced audio processing system 228 can further receive an audio file associated with the AR audio of the AR content item. This audio file can be digitally captured by enhanced audio processing system 228 prior to the AR audio being output by the speaker. The enhanced audio processing system 228 can generate an enhanced audio using the acoustic signals and the audio file and generate an enhanced video using the video and the enhanced audio.

Data Architecture

Figure 3:
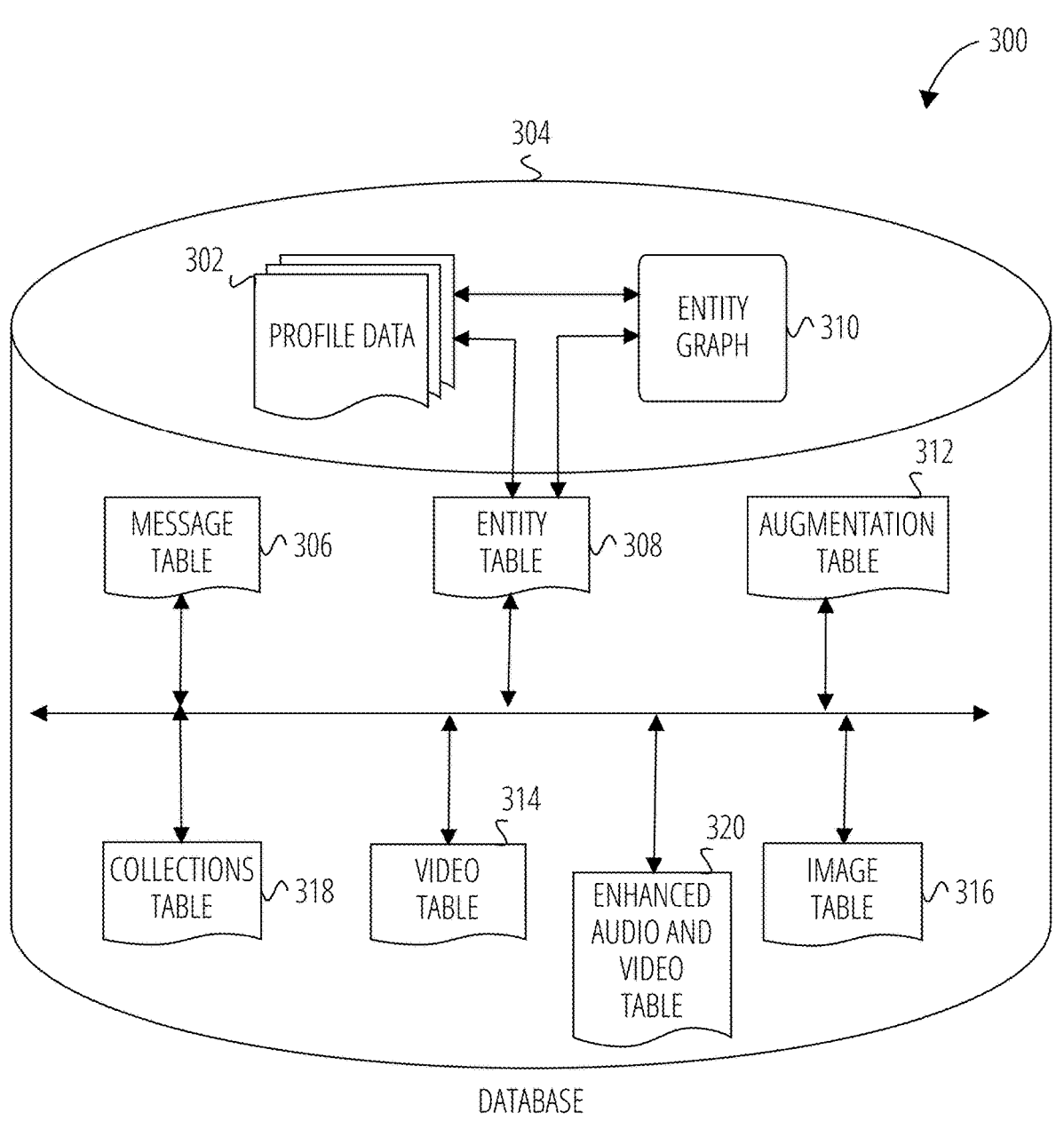
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process.

Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include an enhanced audio and video table 320 that stores, for example, the enhanced video, the speaker output, the audio file, the acoustic signals from the microphones, AR audio from the audio file, AR audio from the speaker output, metadata associated with the AR content item, or any combination thereof.

Data Communications Architecture

Figure 4:
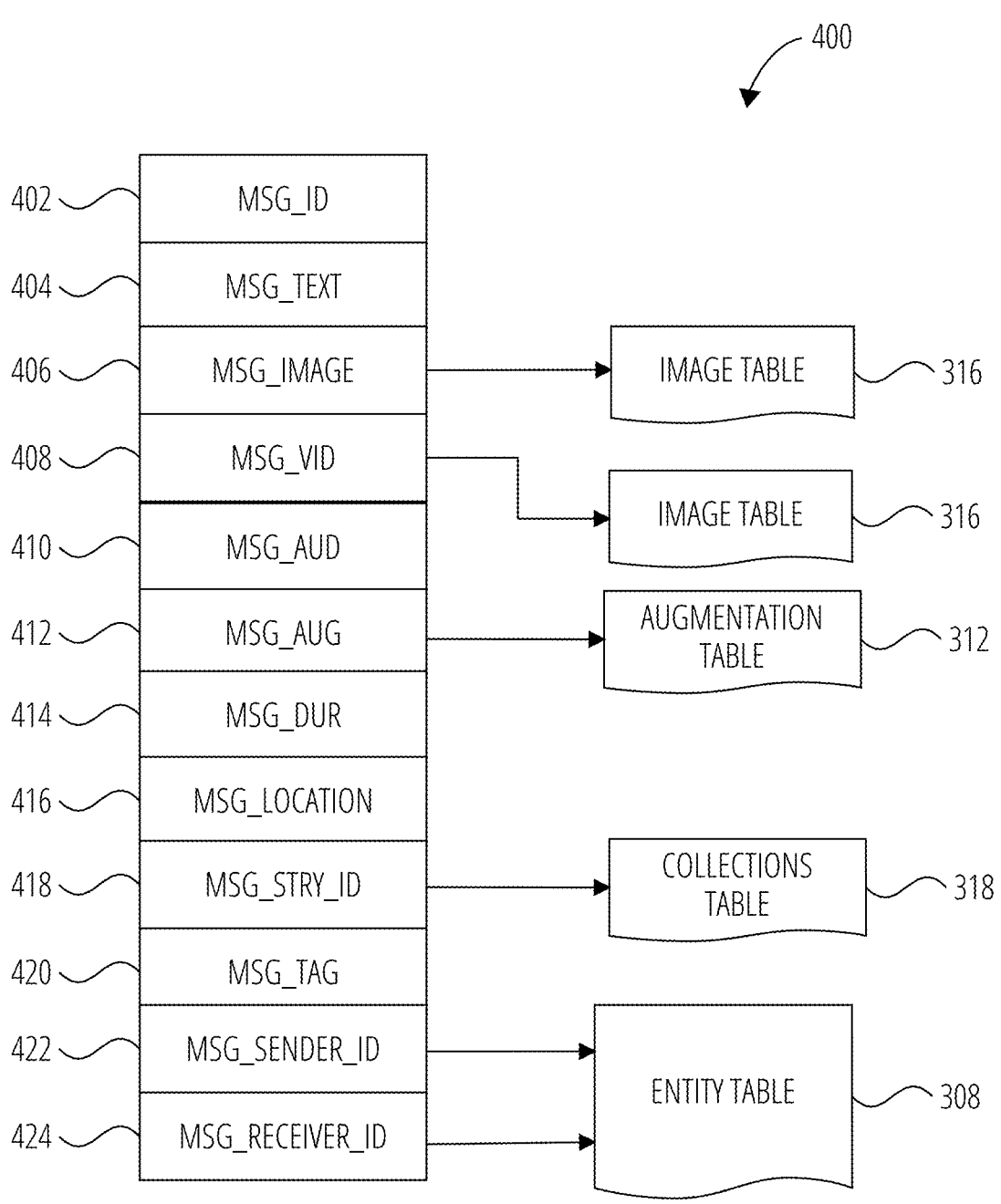
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

Example of Ar Experience Recording

Figure 5:
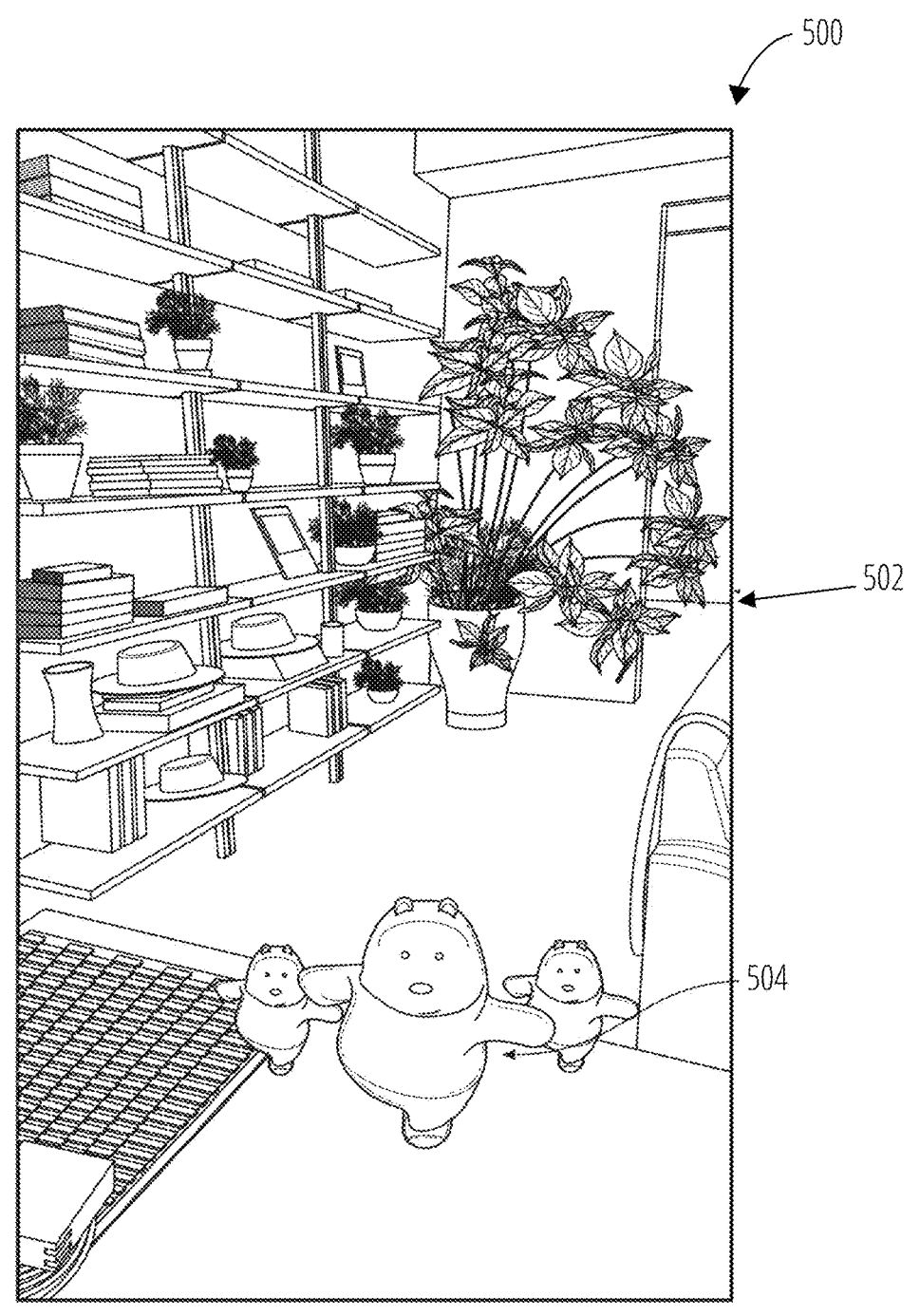
FIG. 5 illustrates an example of frame of a video 500 captured using the user system 102 in accordance with one example.

FIG. 5 illustrates an example of frame of a video 500 captured using the user system 102 in accordance with one example.

User systems 102 that include mobile devices or head-wearable apparatuses 116 (e.g., Augmented Reality (AR) glasses) can be used to capture Augmented Reality (AR) experiences in a video or audio recording. For example, the video 500 can be a captured AR experience.

As shown in FIG. 5, the video 500 includes images of a real-world scene 502 and an augmented reality (AR) content item 504. The AR content item 504 can be a real-time special effect that includes an AR (virtual) object being overlaid on the images of the real-world scene 502. In FIG. 5, the image of three animated bears is the AR object being overlaid on the images of the real-world scene 502.

In one example, the three animated bears can also be singing or generating sounds that are output by a speaker of the user system 102. When capturing the AR experiences in a video or audio recording, the user system 102 needs to generate an audio recording file that includes both the virtual sound objects of the AR content item 504 (e.g., the sounds of the three animated bears or any sound associated with the AR content item 504) as well as the sounds of the real world (e.g., bird chirping in the background, the user of the user system 102 speaking, etc.). Optimally, in order to faithfully reproduce the AR experience as seen and heard by the user of the user system 102, there should not be a discrepancy in the sound quality of the virtual sound objects and the sounds of the real-world in the audio recording file.

System to Enhance Virtual Audio Capture in Ar Experience Recordings

Figure 6:
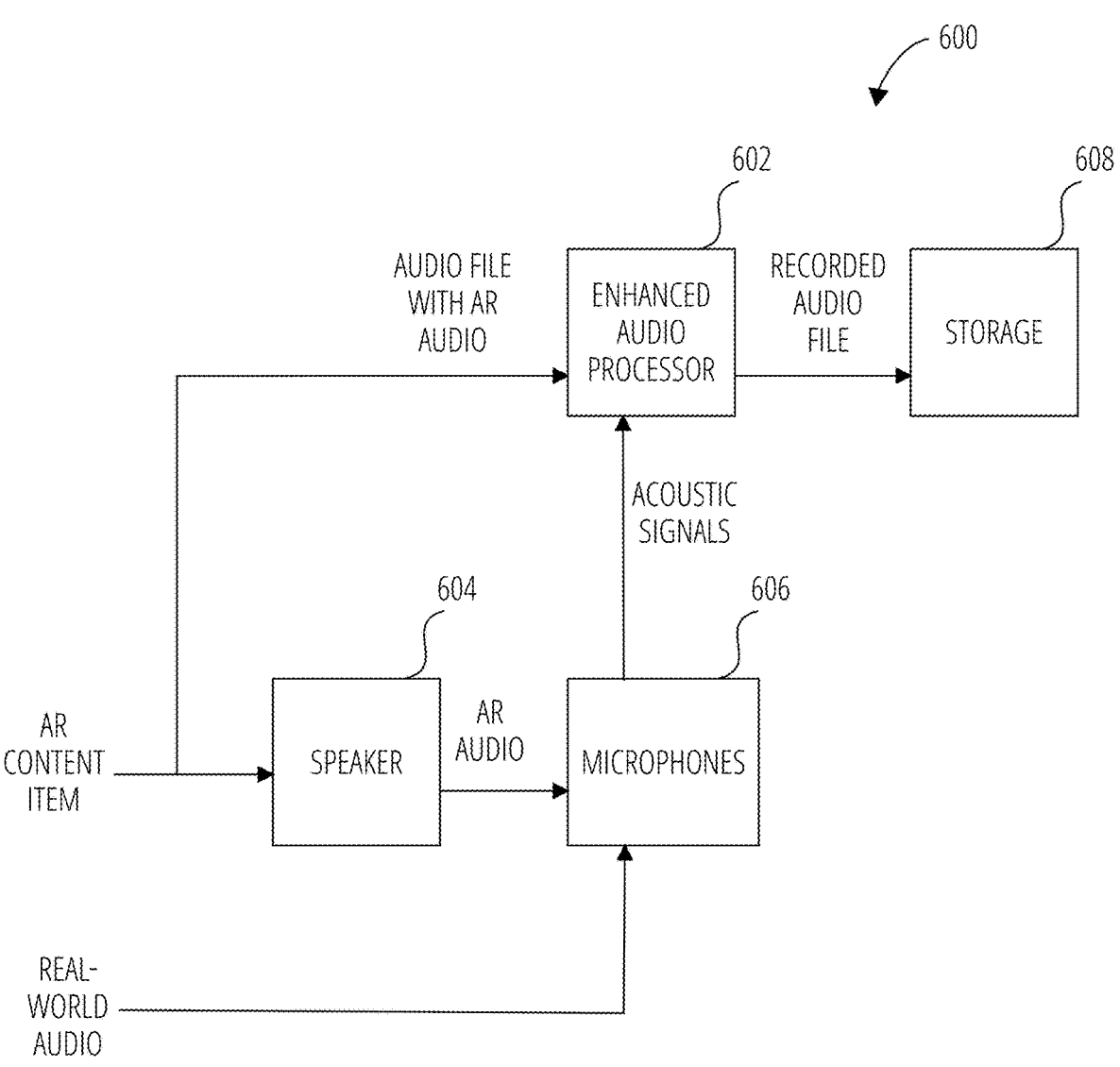
FIG. 6 illustrates an example of system 600 to enhance virtual audio capture in AR experience recordings in accordance with one example.

FIG. 6 illustrates an example of system 600 to enhance virtual audio capture in AR experience recordings in accordance with one example.

The system 600 includes an enhanced audio processor 602, a speaker 604, microphones 606, and a storage 608. The AR content item 504 is included in the AR experience being captured in the video or the audio by the user system 102 (or the system 600).

As shown in FIG. 6, the enhanced audio processor 602 can receive an audio file with the AR audio including the virtual sound objects of the AR content item (e.g., sounds of the singing three animated bears) before the AR audio is output by the speaker 604. In this example, the enhanced audio processor 602 captures the AR audio digitally prior to the AR audio being output by the speaker 604 which avoids having to rely on the speaker-to-microphone path audio for the AR audio.

The speaker 604 also generates speaker output including AR audio of the AR content item 504. The microphones 606 convert acoustic pressure (e.g., audio and sounds) into electrical signals (e.g., acoustic signals). In this example, the microphones 606 generate acoustic signals using the real-world audio as well as the speaker output that includes the AR audio. The sounds of the real world can include, for example, the user's voice or birds chirping in the real-world images in the camera frame as the video 500 is being captured using the user system 102.

The enhanced audio processor 602 can receive the acoustic signals from the microphones 606 and generates an enhanced audio using the acoustic signals and the audio file. The enhanced audio processor 602 can store the enhanced audio in the storage 608. In another example, the storage 608 can store an enhanced video, the speaker output, the audio file, the acoustic signals, or any combination thereof.

The speaker-to-microphone path audio can be removed from the acoustic signals captured by the microphones in real-time by using echo cancelling, volume ducking, or other technique. In one example, the enhanced audio processor 602 generates the enhanced audio in real-time by removing the speaker output or the AR audio included in the speaker output in real-time. The enhanced audio processor 602 can remove the speaker output or the AR audio included in the speaker output by causing the volume of the speaker 604 to be turned down or off such that the AR audio file that includes a cleaner version of the AR audio is selected and used in the mixing to generate the enhanced audio.

In another example, the enhanced audio processor 602 generates the enhanced audio in real-time by performing echo cancellation on the acoustic signals from the microphones 606 using the speaker output from the speaker 604 in real time.

Rather than mixing in real-time, the enhanced audio processor 602 can separately store the acoustic signals from the microphones 606 in the storage 608 and the AR audio from the audio file or from the speaker output in the storage 608. In this example, the enhanced audio processor 602 can perform, at a later time, mixing of the acoustic signals and the AR audio to generate the enhanced audio.

In another example, the enhanced audio processor 602 can receive metadata associated with the AR content item and the acoustic signals including raw audio assets. Rather than mixing in real-time, the enhanced audio processor 602 can perform, at a later time, mixing of the acoustic signals and the AR audio from the audio file using the metadata associated with the AR content item to generate the enhanced audio. For example, the metadata can indicate the timing at which the AR audio of the AR content item is triggered. The enhanced audio processor 602 can then perform a mixing of the AR audio and the acoustic signals from the microphones 606 using the timing from the metadata. Similarly, the metadata can be used to inform the generation of the enhanced video that is generated using the original video captured by the camera and the enhanced audio.

In one example, the system 600 includes a head-wearable apparatus 116 that captures audio content, which when played back, is an imitation of the sound as perceived by the user of the head-wearable apparatus 116. For example, the head-wearable apparatus 116 can record audio using microphones 606 that are arranged to create 3-dimensional (3D) sound sensation for the listener as if present when the audio was recorded. This is called binaural audio. The playback of the captured audio content will have the effect of binaural audio that has the stereo separation and the spectral content that would mimic a human ear and head response. In this example, the captured audio content that has the effect of the binaural audio further includes a captured AR audio from the AR content item 504 in the AR experience that the head-wearable apparatus 116 is capturing. The enhanced audio processor 602 can generate an enhanced audio using the captured audio content that has the effect of the binaural audio and the AR file in accordance with the methods described herein.

Process of Enhancing Virtual Audio Capture in Augmented Reality (Ar) Experience Recordings Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 7 illustrates a process 700 of enhancing virtual audio capture in Augmented Reality (AR) experience recordings in accordance with one example. In one example, the processor in an enhanced audio processing system 228, the processor in the user system 102, the processor in the head-wearable apparatus 116, the processor in the interaction server system 110 or any combination thereof, can perform the operations in process 700.

In operation 702, the processor receives a video from a camera. The camera can be included in a user system 102 that further include a mobile device 114, head-wearable apparatus 116, or computer client device 118. The head-wearable apparatus 116 can be a pair of eyeglasses having a frame that carries a pair of lenses and is coupled to the camera. The pair of lenses can further comprise a display or a user interface.

The video includes images of a real-world scene and an augmented reality (AR) content item. The video 500 of FIG. 5 is an example of the video that includes images of the real-world scene 502 and the AR content item 504. The AR content item is a real-time special effect that includes an AR object being overlaid on the images of the real-world scene. In video 500, the AR content item 504 includes an AR (virtual) object which are the singing animated bears.

In operation 704, the processor receives acoustic signals from a plurality of microphones that generate acoustic signals using real-world audio and a speaker output generated by a speaker. The speaker can be included in the user system 102. When the user system 102 includes the head-wearable apparatus 116, the microphones can be positioned in an orientation to capture binaural audio that includes the acoustic signals. The speaker output can include AR audio of the AR content item. For example, the AR content item 504 in the video 500 in FIG. 5 can include AR audio that is the audio of the singing animated bears.

In operation 706, the processor receives an audio file associated with the AR audio of the AR content item. The processor can receive the audio file before the AR audio of the AR content item is generated by the speaker in the speaker output. In this example, the processor captures the AR audio digitally prior to the AR audio being output by the speaker which avoids having to rely on the speaker-to-microphone path audio for the AR audio.

In operation 708, the processor generates an enhanced audio using the acoustic signals and the audio file. The enhanced audio can be generated in real-time as the AR experience (e.g., the video 500) is being recorded by the user system 102. For example, the processor can generate the enhanced audio by removing the speaker output or the AR audio included in the speaker output in real-time. The processor can remove the speaker output or the AR audio included in the speaker output by causing the volume of the speaker 604 to be turned down or off such that the AR audio file that includes a cleaner version of the AR audio is selected and used in the mixing to generate the enhanced audio. In another example, the processor can also generate the enhanced audio by performing echo cancellation on the acoustic signals using the speaker output in real time.

The enhanced audio can also be generated after the AR experience (e.g., the video 500) is being recorded by the user system 102. For example, the processor can generate the enhanced audio by storing the acoustic signals from the microphones as well as the AR audio from the audio file or from the speaker output in the storage. At a later time, the processor can retrieve the acoustic signals and the AR audio from the storage, and perform mixing of the acoustic signals and the AR audio from the audio file or from the speaker output.

In another example, the processor can generate the enhanced audio by receiving metadata associated with the AR content item and the acoustic signals including raw audio assets. The metadata and the acoustic signals can be stored in the storage for later retrieval and processing. In order to generate the enhanced audio, the processor performs mixing of the acoustic signals and the AR audio from the audio file using the metadata associated with the AR content item.

In operation 710, the processor generates an enhanced video using the video and the enhanced audio. For example, the processor can remove the audio from the video and replace the audio from the video with the enhanced audio. The processor can perform mixing of the audio from the video and the enhanced audio. In one example, the metadata of the AR content item can be used by the processor to combine or mix the original video captured by the camera and the enhanced audio to generate the enhanced video. The processor can store, in a storage, the enhanced video, the speaker output, the audio file, the acoustic signals, or any combination thereof.

System with Head-Wearable Apparatus

Figure 8:
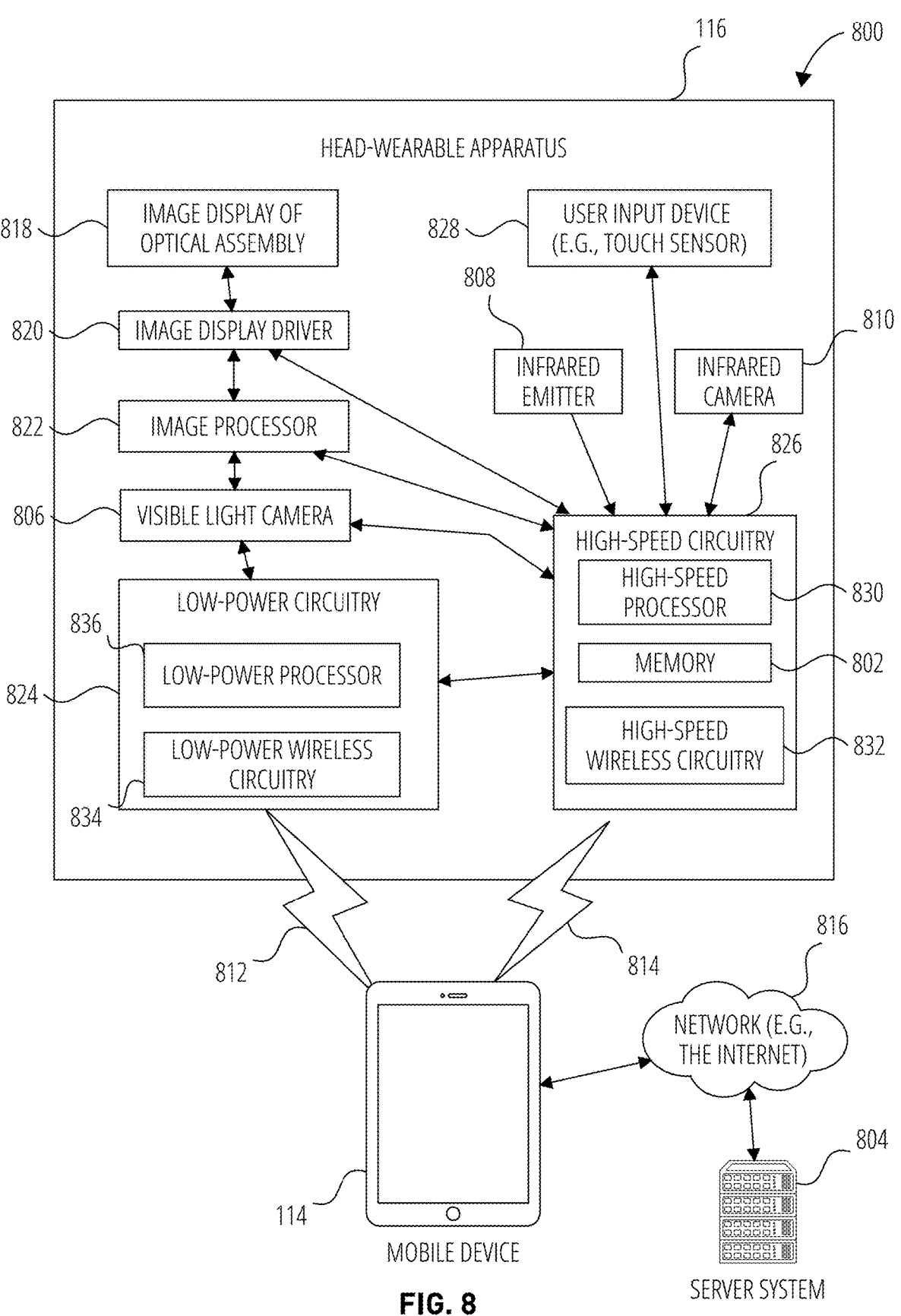
FIG. 8 illustrates a system in which the head-wearable apparatus, according to some examples.

FIG. 8 illustrates a system 800 including a head-wearable apparatus 116, according to some examples. In one example, the user system 102 can include head-wearable apparatus 116. FIG. 8 is a high-level functional block diagram of an example head-wearable apparatus 116 communicatively coupled to a mobile device 114 and various server systems 804 (e.g., the interaction server system 110) via various networks 108.

The head-wearable apparatus 116 includes one or more cameras, each of which may be, for example, a visible light camera 806, an infrared emitter 808, and an infrared camera 810.

The mobile device 114 connects with head-wearable apparatus 116 using both a low-power wireless connection 812 and a high-speed wireless connection 814. The mobile device 114 is also connected to the server system 804 and the network 816.

The head-wearable apparatus 116 further includes two image displays of the image display of optical assembly 818. The two image displays of optical assembly 818 include one associated with the left lateral side and one associated with the right lateral side of the head-wearable apparatus 116. The head-wearable apparatus 116 also includes an image display driver 820, an image processor 822, low-power circuitry 824, and high-speed circuitry 826. The image display of optical assembly 818 is for presenting images and videos, including an image that can include a graphical user interface to a user of the head-wearable apparatus 116.

The image display driver 820 commands and controls the image display of optical assembly 818. The image display driver 820 may deliver image data directly to the image display of optical assembly 818 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 828 (e.g., touch sensor or push button), including an input surface on the head-wearable apparatus 116. The user input device 828 (e.g., touch sensor or push button) is to receive from the user an input selection to manipulate the graphical user interface of the presented image.

The components shown in FIG. 8 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 806 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 802, which stores instructions to perform a subset or all of the functions described herein. The memory 802 can also include storage device.

As shown in FIG. 8, the high-speed circuitry 826 includes a high-speed processor 830, a memory 802, and high-speed wireless circuitry 832. In some examples, the image display driver 820 is coupled to the high-speed circuitry 826 and operated by the high-speed processor 830 in order to drive the left and right image displays of the image display of optical assembly 818. The high-speed processor 830 may be any processor capable of managing high-speed communications and operation of any general computing system needed for the head-wearable apparatus 116. The high-speed processor 830 includes processing resources needed for managing high-speed data transfers on a high-speed wireless connection 814 to a wireless local area network (WLAN) using the high-speed wireless circuitry 832. In certain examples, the high-speed processor 830 executes an operating system such as a LINUX operating system or other such operating system of the head-wearable apparatus 116, and the operating system is stored in the memory 802 for execution. In addition to any other responsibilities, the high-speed processor 830 executing a software architecture for the head-wearable apparatus 116 is used to manage data transfers with high-speed wireless circuitry 832. In certain examples, the high-speed wireless circuitry 832 is config- ured to implement Institute of Electrical and Electronic Engineers (IEEE) 802.11 communication standards, also referred to herein as WI-FIR. In some examples, other high-speed communications standards may be implemented by the high-speed wireless circuitry 832.

The low-power wireless circuitry 834 and the high-speed wireless circuitry 832 of the head-wearable apparatus 116 can include short-range transceivers (Bluetooth™) and wire- less wide, local, or wide area network transceivers (e.g., cellular or WI-FI®). Mobile device 114, including the transceivers communicating via the low-power wireless connection 812 and the high-speed wireless connection 814, may be implemented using details of the architecture of the head-wearable apparatus 116, as can other elements of the network 816.

The memory 802 includes any storage device capable of storing various data and applications, including, among other things, camera data generated by the left and right visible light cameras 806, the infrared camera 810, and the image processor 822, as well as images generated for display by the image display driver 820 on the image displays of the image display of optical assembly 818. While the memory 802 is shown as integrated with high-speed circuitry 826, in some examples, the memory 802 may be an independent standalone element of the head-wearable apparatus 116. In certain such examples, electrical routing lines may provide a connection through a chip that includes the high-speed processor 830 from the image processor 822 or the low- power processor 836 to the memory 802. In some examples, the high-speed processor 830 may manage addressing of the memory 802 such that the low-power processor 836 will boot the high-speed processor 830 any time that a read or write operation involving memory 802 is needed.

As shown in FIG. 8, the low-power processor 836 or high-speed processor 830 of the head-wearable apparatus 116 can be coupled to the camera (visible light camera 806, infrared emitter 808, or infrared camera 810), the image display driver 820, the user input device 828 (e.g., touch sensor or push button), and the memory 802.

The head-wearable apparatus 116 is connected to a host computer. For example, the head-wearable apparatus 116 is paired with the mobile device 114 via the high-speed wire- less connection 814 or connected to the server system 804 via the network 816. The server system 804 may be one or more computing devices as part of a service or network computing system, for example, that includes a processor, a memory, and network communication interface to commu- nicate over the network 816 with the mobile device 114 and the head-wearable apparatus 116.

The mobile device 114 includes a processor and a network communication interface coupled to the processor. The network communication interface allows for communication over the network 816, low-power wireless connection 812, or high-speed wireless connection 814. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a wave- guide. The image displays of the optical assembly are driven by the image display driver 820. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 804, such as the user input device 828, may include alphanumeric input compo- nents (e.g., a keyboard, a touch screen configured to receive alphanumeric input, a photo-optical keyboard, or other alphanumeric input components), point-based input compo- nents (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include addi- tional peripheral device elements. Such peripheral device elements may include biometric sensors, additional sensors, or display elements integrated with the head-wearable appa- ratus 116. For example, peripheral device elements may include any I/O components including output components, motion components, position components, or any other such elements described herein.

For example, the biometric components include compo- nents to detect expressions (e.g., hand expressions, facial expressions, vocal expressions, body gestures, or eye-track- ing), measure biosignals (e.g., blood pressure, heart rate, body temperature, perspiration, or brain waves), identify a person (e.g., voice identification, retinal identification, facial identification, fingerprint identification, or electroencepha- logram based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric compo- nents is captured and stored with only user approval and deleted on user request. Further, such biometric data may be used for very limited purposes, such as identification veri- fication. To ensure limited and authorized use of biometric information and other personally identifiable information (PII), access to this data is restricted to authorized personnel only, if at all. Any use of biometric data may strictly be limited to identification verification purposes, and the bio- metric data is not shared or sold to any third party without the explicit consent of the user. In addition, appropriate technical and organizational measures are implemented to ensure the security and confidentiality of this sensitive information.

The motion components include acceleration sensor com- ponents (e.g., accelerometer), gravitation sensor compo- nents, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 812 and high-speed wireless connection 814 from the mobile device 114 via the low-power wireless circuitry 834 or high-speed wireless circuitry 832.

Machine Architecture

Figure 9:
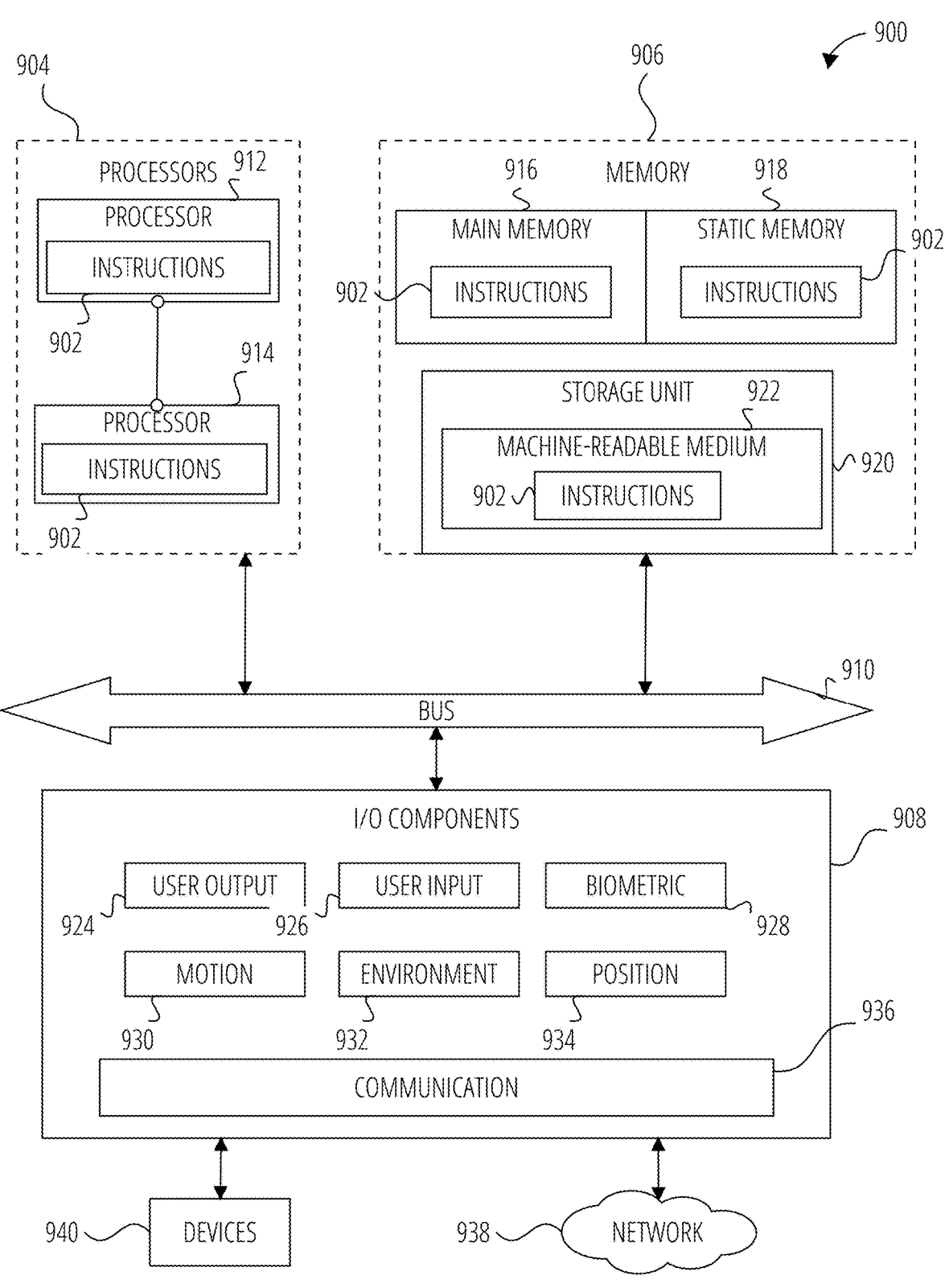
FIG. 9 is a diagrammatic representation of a machine in the form of a computer system within which a set of instructions may be executed to cause the machine to perform any one or more of the methodologies discussed herein, according to some examples.

FIG. 9 is a diagrammatic representation of the machine 900 within which instructions 902 (e.g., software, a program, an application, an applet, an app, or other executable code) for causing the machine 900 to perform any one or more of the methodologies discussed herein may be executed. For example, the instructions 902 may cause the machine 900 to execute any one or more of the methods described herein. The instructions 902 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 902, sequentially or otherwise, that specify actions to be taken by the machine 900. Further, while a single machine 900 is illustrated, the term "machine" shall also be taken to include a collection of machines that individually or jointly execute the instructions 902 to perform any one or more of the methodologies discussed herein. The machine 900, for example, may comprise the user system 102 or any one of multiple server devices forming part of the interaction server system 110. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 908, which may be configured to communicate with each other via a bus 910. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that execute the instructions 902. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 916, a static memory 918, and a storage unit 920, both accessible to the processors 904 via the bus 910. The main memory 906, the static memory 918, and storage unit 920 store the instructions 902 embodying any one or more of the methodologies or functions described herein. The instructions 902 may also reside, completely or partially, within the main memory 916, within the static memory 918, within machine-readable medium 922 within the storage unit 920, within at least one of the processors 904 (e.g., within the processor's cache memory), or any suitable combination thereof, during execution thereof by the machine 900.

The I/O components 908 may include a wide variety of components to receive input, provide output, produce output, transmit information, exchange information, capture measurements, and so on. The specific I/O components 908 that are included in a particular machine will depend on the type of machine. For example, portable machines such as mobile phones may include a touch input device or other such input mechanisms, while a headless server machine will likely not include such a touch input device. It will be appreciated that the I/O components 908 may include many other components that are not shown in FIG. 9. In various examples, the I/O components 908 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 908 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 908 further include communication components 936 operable to couple the machine 900 to a network 938 or devices 940 via respective coupling or connections. For example, the communication components 936 may include a network interface component or another suitable device to interface with the network 938. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 940 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 916, static memory 918, and memory of the processors 904) and storage unit 920 may store one or more sets of instructions and data structures (e.g., software) embodying or used by any one or more of the methodologies or functions described herein. These instructions (e.g., the instructions 902), when executed by processors 904, cause various operations to implement the disclosed examples.

The instructions 902 may be transmitted or received over the network 938, using a transmission medium, via a network interface device (e.g., a network interface component included in the communication components 936) and using any one of several well-known transfer protocols (e.g., hypertext transfer protocol (HTTP)). Similarly, the instructions 902 may be transmitted or received using a transmission medium via a coupling (e.g., a peer-to-peer coupling) to the devices 940.

Software Architecture

Figure 10:
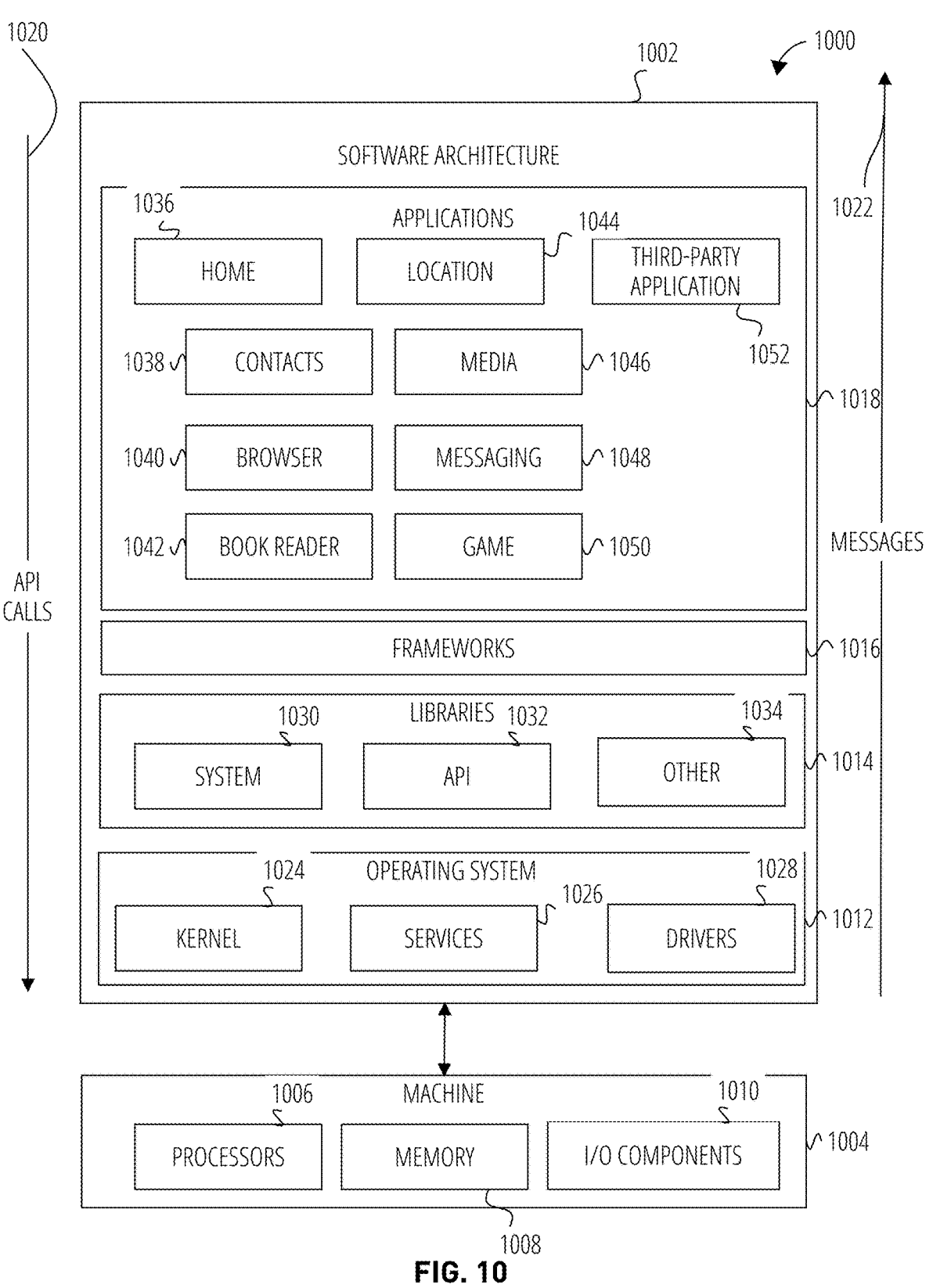
FIG. 10 is a block diagram showing a software architecture within which examples may be implemented.

FIG. 10 is a block diagram 1000 illustrating a software architecture 1002, which can be installed on any one or more of the devices described herein. The software architecture 1002 is supported by hardware such as a machine 1004 that includes processors 1006, memory 1008, and I/O components 1010. In this example, the software architecture 1002 can be conceptualized as a stack of layers, where each layer provides a particular functionality. The software architecture 1002 includes layers such as an operating system 1012, libraries 1014, frameworks 1016, and applications 1018. Operationally, the applications 1018 invoke API calls 1020 through the software stack and receive messages 1022 in response to the API calls 1020.

The operating system 1012 manages hardware resources and provides common services. The operating system 1012 includes, for example, a kernel 1024, services 1026, and drivers 1028. The kernel 1024 acts as an abstraction layer between the hardware and the other software layers. For example, the kernel 1024 provides memory management, processor management (e.g., scheduling), component management, networking, and security settings, among other functionalities. The services 1026 can provide other common services for the other software layers. The drivers 1028 are responsible for controlling or interfacing with the underlying hardware. For instance, the drivers 1028 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1014 provide a common low-level infrastructure used by the applications 1018. The libraries 1014 can include system libraries 1030 (e.g., C standard library) that provide functions such as memory allocation functions, string manipulation functions, mathematic functions, and the like. In addition, the libraries 1014 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1014 can also include a wide variety of other libraries 1034 to provide many other APIs to the applications 1018.

The frameworks 1016 provide a common high-level infrastructure that is used by the applications 1018. For example, the frameworks 1016 provide various graphical user interface (GUI) functions, high-level resource management, and high-level location services. The frameworks 1016 can provide a broad spectrum of other APIs that can be used by the applications 1018, some of which may be specific to a particular operating system or platform.

In an example, the applications 1018 may include a home application 1036, a contacts application 1038, a browser application 1040, a book reader application 1042, a location application 1044, a media application 1046, a messaging application 1048, a game application 1050, and a broad assortment of other applications such as a third-party application 1052. The applications 1018 are programs that execute functions defined in the programs. Various programming languages can be employed to create one or more of the applications 1018, structured in a variety of manners, such as object-oriented programming languages (e.g., Objective-C, Java, or C++) or procedural programming languages (e.g., C or assembly language). In a specific example, the third-party application 1052 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1052 can invoke the API calls 1020 provided by the operating system 1012 to facilitate functionalities described herein.

Examples

Example 1 is a method including receiving, by a processor, a video from a camera, the video including images of a real-world scene and an augmented reality (AR) content item; receiving acoustic signals from a plurality of microphones that generate acoustic signals using real-world audio and a speaker output, the speaker output including AR audio of the AR content item; receiving an audio file associated with the AR audio of the AR content item; generating an enhanced audio using the acoustic signals and the audio file; and generating an enhanced video using the video and the enhanced audio.

In Example 2, the subject matter of Example 1 including wherein generating the enhanced audio further comprises removing the speaker output or the AR audio included in the speaker output in real-time.

In Example 3, the subject matter of Examples 1-2 including wherein generating the enhanced audio further comprises performing echo cancellation on the acoustic signals using the speaker output in real time.

In Example 4, the subject matter of Examples 1-3 including storing the enhanced video, the speaker output, the audio file, the acoustic signals, or any combination thereof.

In Example 5, the subject matter of Examples 1-4 including wherein generating the enhanced audio further comprises: storing the acoustic signals from the microphones in a storage; storing the AR audio from the audio file or from the speaker output in the storage; and mixing acoustic signals and the AR audio from the audio file or from the speaker output.

In Example 6, the subject matter of Examples 1-5 including wherein generating the enhanced audio further comprises: receiving metadata associated with the AR content item; receiving the acoustic signals including raw audio assets; and mixing the mixing acoustic signals and the AR audio from the audio file using the metadata associated with the AR content item.

In Example 7, the subject matter of Examples 1-6 including wherein the audio file associated with the AR audio of the AR content item is received before the AR audio of the AR content item is generated by the speaker in the speaker output.

In Example 8, the subject matter of Examples 1-7 including wherein the AR content item is a real-time special effect that includes an AR object being overlaid on the images of the real-world scene.

Example 9 is a non-transitory computer-readable storage medium storing instructions that, when executed by at least one processor, cause the at least one processor to perform the method of any of Examples 1-8.

Example 10 is an apparatus comprising means to implement of any of Examples 1-9.

Example 11 is a system to implement of any of Examples 1-8.

In Example 12, the subject matter of Examples 11, including wherein the system is a head-wearable apparatus or a client device.

In Example 13, the subject matter of Examples 11-12, including wherein the head-wearable apparatus is a pair of eyeglasses, having a frame that carries a pair of lenses and is coupled to the camera.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metro-politan area network (MAN), the Internet, a portion of the Internet, a portion of the Public Switched Telephone Net-work (PSTN), a plain old telephone service (POTS) net-work, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cel-lular or wireless coupling. In this example, the coupling may implement any of a variety of types of data transfer tech-nology, such as Single Carrier Radio Transmission Technol-ogy (1×RTT), Evolution-Data Optimized (EVDO) technol-ogy, General Packet Radio Service (GPRS) technology, Enhanced Data rates for GSM Evolution (EDGE) technol-ogy, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organi-zations, other long-range protocols, or other data transfer technology.

"Component" refers, for example, to a device, physical entity, or logic having boundaries defined by function or subroutine calls, branch points, APIs, or other technologies that provide for the partitioning or modularization of par-ticular processing or control functions. Components may be combined via their interfaces with other components to carry out a machine process. A component may be a packaged functional hardware unit designed for use with other com-ponents and a part of a program that usually performs a particular function of related functions. Components may constitute either software components (e.g., code embodied on a machine-readable medium) or hardware components. A "hardware component" is a tangible unit capable of per-forming certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware compo-nent may also be implemented mechanically, electronically, or any suitable combination thereof. For example, a hard-ware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or cir-cuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedi-cated and permanently configured circuitry, or in temporar-ily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Consid-ering examples in which hardware components are tempo-rarily configured (e.g., programmed), each of the hardware components need not be configured or instantiated at any one instance in time. For example, where a hardware com-ponent comprises a general-purpose processor configured by software to become a special-purpose processor, the general-purpose processor may be configured as respectively differ-ent special-purpose processors (e.g., comprising different hardware components) at different times. Software accord-ingly configures a particular processor or processors, for example, to constitute a particular hardware component at one instance of time and to constitute a different hardware component at a different instance of time. Hardware com-ponents can provide information to, and receive information from, other hardware components. Accordingly, the described hardware components may be regarded as being communicatively coupled. Where multiple hardware com-ponents exist contemporaneously, communications may be achieved through signal transmission (e.g., over appropriate circuits and buses) between or among two or more of the hardware components. In examples in which multiple hard-ware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are tempo-rarily configured (e.g., by software) or permanently config-ured to perform the relevant operations. Whether temporar-ily or permanently configured, such processors may constitute processor-implemented components that operate to perform one or more operations or functions described herein. As used herein, "processor-implemented compo-nent" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system comprising:
a camera to capture a video that includes images of a real-world scene and an augmented reality (AR) content item;
a speaker to generate speaker output including AR audio of the AR content item;
a plurality of microphones that generate acoustic signals using real-world audio and the speaker output;
a processor
   to receive the acoustic signals from the plurality of microphones,
   to receive an audio file including the AR audio of the AR content item,
   to generate an enhanced audio using the acoustic signals and the audio file, wherein generating the enhanced audio comprises:
      selecting the AR audio from the audio file or the AR audio from the speaker output based on a metadata associated with the AR content item, wherein the metadata includes a timing for the AR audio that indicates the timing at which the processor selects the AR audio from the audio file, and
      mixing the acoustic signals with the selected AR audio, and to generate an enhanced video using the video and the enhanced audio.

2. The system of claim 1, wherein the processor to generate the enhanced audio comprises:
removing the speaker output or the AR audio included in the speaker output in real-time.

3. The system of claim 1, wherein the processor to generate the enhanced audio comprises:
performing echo cancellation on the acoustic signals using the speaker output in real time.

4. The system of claim 1, further comprising:
a storage to store the enhanced video, the speaker output, the audio file, the acoustic signals, or any combination thereof.

5. The system of claim 1, wherein the processor to generate the enhanced audio comprises:
storing the acoustic signals from the microphones in a storage; and
storing the AR audio from the audio file or from the speaker output in the storage.

6. The system of claim 1, wherein the processor to generate the enhanced audio comprises:
receiving metadata associated with the AR content item;
receiving the acoustic signals including raw audio assets.

7. The system of claim 1, wherein the processor receives the audio file associated with the AR audio of the AR content item before the AR audio of the AR content item is generated by the speaker in the speaker output.

8. The system of claim 1, wherein the AR content item is a real-time special effect that includes an AR object being overlaid on the images of the real-world scene.

9. The system of claim 1, wherein the system is a head-wearable apparatus or a client device.

10. The system of claim 9, wherein the head-wearable apparatus is a pair of eyeglasses, having a frame that carries a pair of lenses and is coupled to the camera.

11. The system of claim 9, wherein the microphones capture binaural audio that includes the acoustic signals.

12. A method comprising:

receiving, by a processor, a video from a camera, the video including images of a real-world scene and an augmented reality (AR) content item;

receiving acoustic signals from a plurality of microphones that generate acoustic signals using real-world audio and a speaker output, the speaker output including AR audio of the AR content item;

receiving an audio file including the AR audio of the AR content item;

generating an enhanced audio using the acoustic signals and the audio file, wherein generating the enhanced audio comprises:

selecting the AR audio from the audio file or the AR audio from the speaker output based on a metadata associated with the AR content item, wherein the metadata includes a timing for the AR audio that indicates the timing at which the processor selects the AR audio from the audio file, and mixing the acoustic signals with the selected AR audio, and generating an enhanced video using the video and the enhanced audio.

13. The method of claim 12, wherein generating the enhanced audio further comprises:

removing the speaker output or the AR audio included in the speaker output in real-time.

14. The method of claim 12, wherein generating the enhanced audio further comprises:

performing echo cancellation on the acoustic signals using the speaker output in real time.

15. The method of claim 12, further comprising:

storing the enhanced video, the speaker output, the audio file, the acoustic signals, or any combination thereof.

16. The method of claim 12, wherein generating the enhanced audio further comprises:

storing the acoustic signals from the microphones in a storage; and storing the AR audio from the audio file or from the speaker output in the storage.

17. The method of claim 12, wherein generating the enhanced audio further comprises:

receiving metadata associated with the AR content item; and receiving the acoustic signals including raw audio assets.

18. The method of claim 12, wherein the audio file associated with the AR audio of the AR content item is received before the AR audio of the AR content item is generated by the speaker in the speaker output.

19. The method of claim 12, wherein the AR content item is a real-time special effect that includes an AR object being overlaid on the images of the real-world scene.

20. A non-transitory computer-readable storage medium storing instructions that, when executed by at least one processor, cause the at least one processor to perform operations comprising:

receiving a video from a camera, the video including images of a real-world scene and an augmented reality (AR) content item;

receiving acoustic signals from a plurality of microphones that generate the acoustic signals using real-world audio and a speaker output, the speaker output including AR audio of the AR content item;

receiving an audio file including the AR audio of the AR content item;

generating an enhanced audio using the acoustic signals and the audio file, wherein generating the enhanced audio comprises:

selecting the AR audio from the audio file or the AR audio from the speaker output based on a metadata associated with the AR content item, wherein the metadata includes a timing for the AR audio that indicates the timing at which the processor selects the AR audio from the audio file, and mixing the acoustic signals with the selected AR audio; and generating an enhanced video using the video and the enhanced audio.

* * * * *